US005271307A

United States Patent [19]

Pollock

[11] Patent Number: 5,271,307

[45] Date of Patent: Dec. 21, 1993

[54] GUITAR BRIDGE ASSEMBLY

[76] Inventor: Gregory P. Pollock, 3810 Valley View Rd. #113, Austin, Tex. 78704

[21] Appl. No.: 950,143

[22] Filed: Sep. 24, 1992

[51] Int. Cl.[5] .................... G01D 3/04

[52] U.S. Cl. .................... 84/298; 84/307

[58] Field of Search .................... 84/298, 307, 267, 308, 84/309

[56] References Cited

U.S. PATENT DOCUMENTS 3,563,126 2/1971 Connington .................... 84/298 X 4,425,832 1/1984 Peavey .................... 84/298

4,464,970 8/1984 Mischakoff .................... 84/298

4,538,498 9/1985 Marten .................... 84/298

*Primary Examiner*—Michael L. Gellner

*Assistant Examiner*—P. Stanzione

*Attorney, Agent, or Firm*—Leon Gilden

[57] ABSTRACT

A guitar bridge assembly includes a first base body receiving a second base body capturing a bridge angularly oriented relative to an anchor plate at an acute angle relative to one another for securement of guitar strings about a top surface of a guitar body.

5 Claims, 4 Drawing Sheets

GUITAR BRIDGE ASSEMBLY

BACKGROUND OF THE INVENTION

1. Field of the Invention

The field of invention relates to guitar bridge structure, and more particularly pertains to a new and improved guitar bridge assembly arranged for the mounting of guitar strings relative to a jazz guitar.

2. Description of the Prior Art

Jazz guitars are of a somewhat variant construction relative to guitar construction, with the neck portion of the guitar tilted frequently back at an angulation of substantially two and one-half degrees. Heretofore this neck design has required a separate bridge and tail piece with strings running over an associated bridge terminating in the tail piece. The instant invention attempts to overcome deficiencies of such prior art structure by providing a unitary organization incorporating a saddle and anchor plate arranged for mounting the guitars in a raised orientation relative to a top surface of a guitar body for enhanced harmonics and use of the guitar strings. Prior art guitar bridge structure is exemplified in the U.S. Pat. Nos. 4,334,454; 4,464,970; 3,563,126; 4,430,919; and U.S. Design patent 269,438.

Accordingly, it may be appreciated there continues to be a need for a new and improved guitar bridge assembly as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of guitar bridge apparatus now present in the prior art. the present invention provides a guitar bridge assembly wherein the same utilizes a unitary base portion mounting a saddle and anchor plate structure at an acute angle relative to one another to the base assembly. As such, the general purpose of the present invention, which will be described subsequently in greater detail, is to provide a new and improved guitar bridge assembly which has all the advantages of the prior art guitar bridge apparatus and none of the disadvantages.

To attain this, the present invention provides a guitar bridge assembly including a first base body receiving a second base body capturing a bridge angularly oriented relative to an anchor plate at an acute angle relative to one another for securement of guitar strings about a top surface of a guitar body.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved guitar bridge assembly which has all the advantages of the prior art guitar bridge apparatus and none of the disadvantages.

It is another object of the present invention to provide a new and improved guitar bridge assembly which may be easily and efficiently manufactured and marketed.

It is a further object of the present invention to provide a new and improved guitar bridge assembly which is of a durable and reliable construction.

An even further object of the present invention is to provide a new and improved guitar bridge assembly which is susceptible of a low cost of manufacture with regard to both materials and labor, and which accordingly is then susceptible of low prices of sale to the consuming public, thereby making such guitar bridge assemblies economically available to the buying public.

Still yet another object of the present invention is to provide a new and improved guitar bridge assembly which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
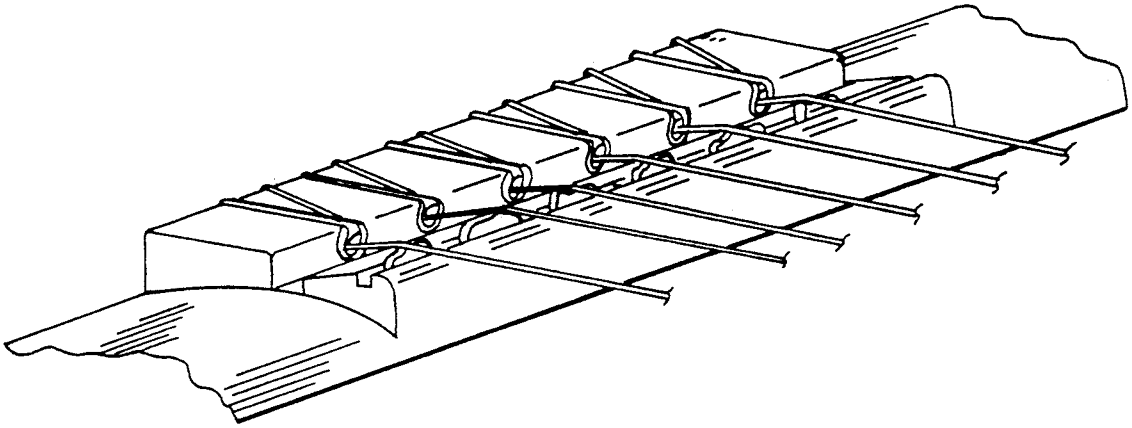
FIG. 1 PRIOR ART
FIG. 1 is an isometric illustration of a prior art guitar bridge structure, as exemplified in U.S. Pat. No. 4,464,970.

With reference now to the drawings, and in particular to FIGS. 1 to 11 thereof, a new and improved guitar bridge assembly embodying the principles and concepts of the present invention and generally designated by the reference numeral 10 will be described.

Figure 2:
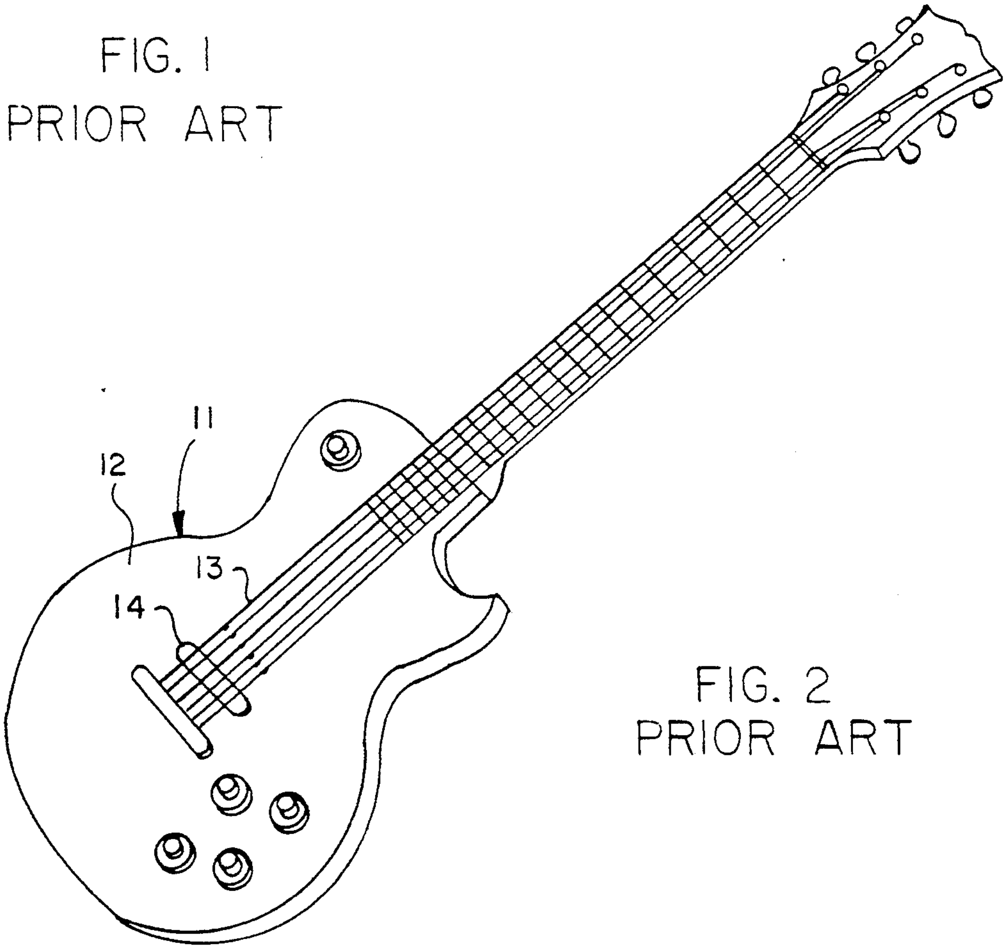
FIG. 2 PRIOR ART
FIG. 2 is an isometric illustration of a prior art guitar bridge, as typically utilized in the prior art and set forth in the U.S. Pat. No. 4,334,454.
Figure 3:
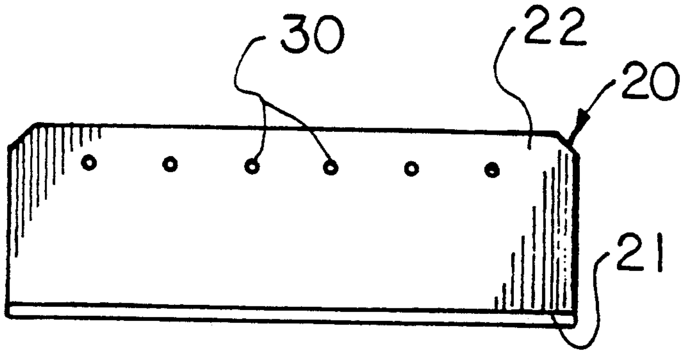
FIG. 3 is an orthographic side view of the anchor plate structure.
Figure 4:
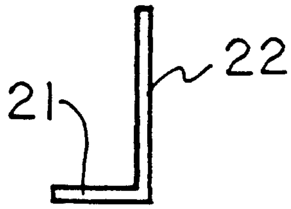
FIG. 4 is an orthographic end view of the anchor plate structure.
Figure 5:
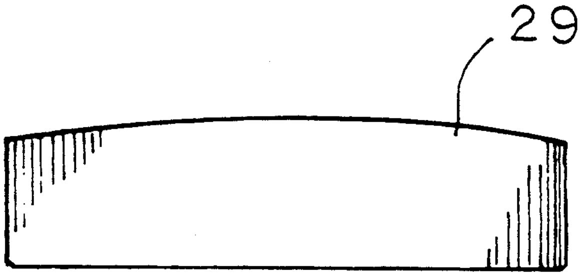
FIG. 5 is an orthographic elevational view of the saddle of the organization.
Figure 6:
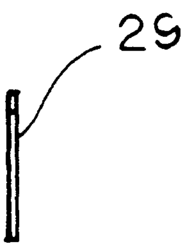
FIG. 6 is an orthographic end view of the saddle of the organization.
Figure 8:
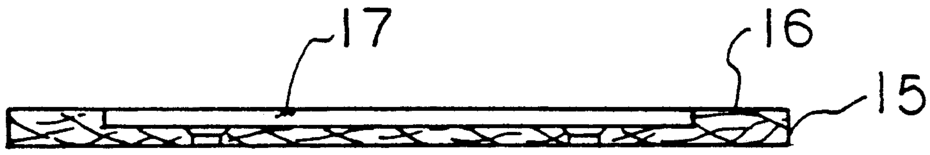
FIG. 8 is an orthographic view, taken along the lines 8—8 of FIG. 7 in the direction indicated by the arrows.
Figure 7:
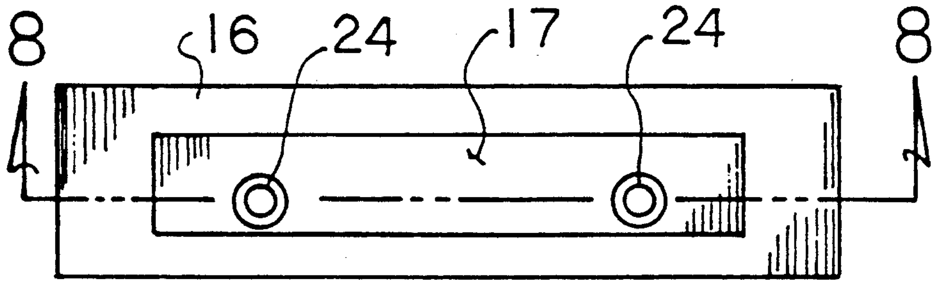
FIG. 7 is an orthographic top view of the first base body.
Figure 9:
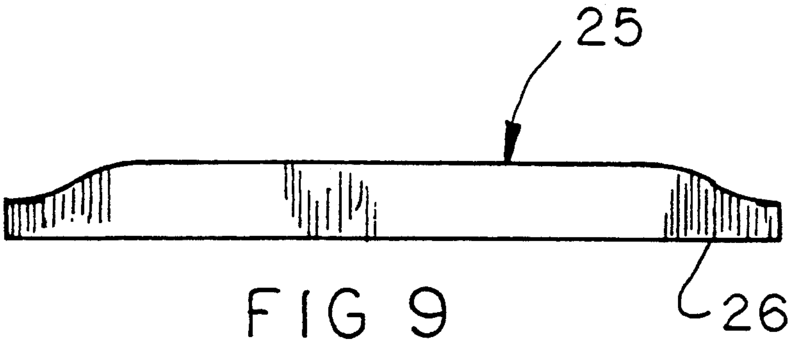
FIG. 9 is an orthographic side view of the second base body.
Figure 10:
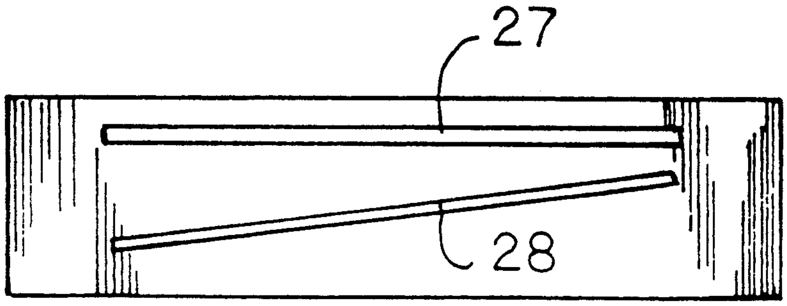
FIG. 10 is an orthographic top view of the second base body.
Figure 11:
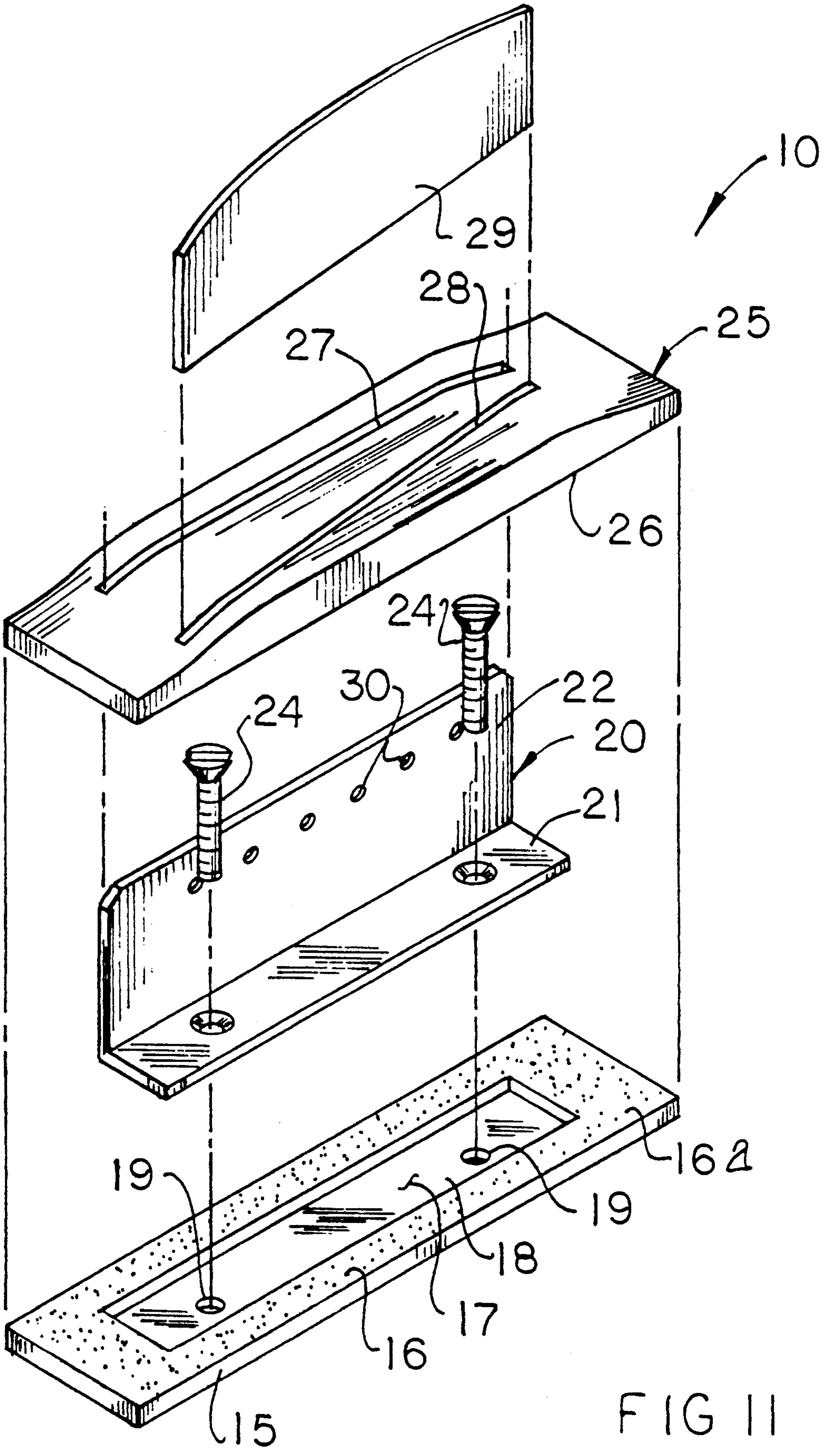
FIG. 11 is an isometric illustration of the invention in an exploded illustration.

More specifically, the guitar bridge assembly 10 of the instant invention sets forth an improvement over the prior art, such as illustrated in the FIGS. 1 and 2, directed to the U.S. Pat. No. 4,464,970 and 4,334,454 respectively.

The guitar of the FIG. 2 is exemplary of guitar bodies 11 having a guitar body top wall 12 mounting a plurality of strings 13 to a bridge assembly 14 spaced from an anchor structure.

The guitar bridge assembly 10 of the invention includes a first base body 15 having a first base body top wall 16, having a top wall cavity 17 directed into the base body from the top wall. The cavity 17 includes a cavity floor 18, with a plurality of fastener apertures 19 directed through the floor 18 for securement to the guitar body top wall 12. A metallic anchor plate 20 of a generally L-shaped configuration includes a first plate portion 21 orthogonally and integrally mounted to a second plate portion 22. The second plate portion 22 is of a predetermined length as is the first plate portion 21, with the first plate portion 21 received complementarily within the top wall cavity 17 in contiguous communication with the floor 18. The first plate portion 21 includes a plurality of first plate portion apertures 23, each aligned with one of the fastener apertures 19 to receive a fastener member 24 through one of the first plate portion apertures 23 and one of the fastener apertures 19, directing one of the fastener members 24 into the guitar body 11.

A second base body 25 having an unnumbered top wall is provided and secured in contiguous communication to the first base body top wall 16 utilizing adhesives or mechanical fasteners, as required. Adhesive 16*a* is indicated. The second base body 25 includes a second base body bottom wall 26 that is arranged coextensively and in contiguous communication with the first base body top wall 16 when the first and second base bodies are secured together. A first through-extending slot 27 is orthogonally directed through the second base body bottom wall 26 extending through a second base body to receive the second plate portion 22 therethrough, wherein the first slot 27 is of said predetermined length and orthogonally oriented relative to the first base body top wall 16. A first groove 28 positioned adjacent the first slot 27 through a top surface of the second base body 25 is skewed at an acute angle relative to the first slot 27 to fixedly mount a bone plate saddle 29 within the first groove 28 utilizing adhesives and the like. The bone plate saddle includes an arcuate top edge 31 directing guitar strings 13 thereover, with the metallic anchor plate's second plate portion 22 having a plurality of string mounting apertures 30 adjacent an upper edge of the second plate portion 22 for securement of the strings thereto to provide for a unitary organization for the mounting and bridging of the guitar strings 13 relative to the guitar structure.

As to the manner of usage and operation of the instant invention, the same should be apparent from the above disclosure and accordingly, no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A guitar and guitar bridge assembly, comprising, a guitar body, the guitar body having a top wall and a plurality of guitar strings directed over the top wall, and the bridge assembly including a first base body, the first base body having a first base body top wall, and a top wall cavity directed into the first base body from the top wall, the cavity including a cavity floor, and a plurality of fastener apertures directed through the cavity floor, and a second base body, the second base body including a second base body bottom wall, the second base body bottom wall in contiguous securement to the first base body top wall, wherein the second base body includes a second base body top wall spaced from the second base body floor, and a first slot directed through the second base body top wall orthogonally directed through the second base body bottom wall, and a metallic anchor plate having a first plate portion integrally and orthogonally mounted to a second plate portion, and the first plate portion received within the top wall cavity, and the second plate portion directed through the first slot, and a first groove directed into the second base body top wall spaced from the first slot, and a saddle mounted within the first groove, and the guitar strings directed over the saddle and secured to the second plate portion.

2. A guitar and guitar bridge assembly as set forth in claim 1 wherein the first slot is skewed relative to the first groove defining an acute angle therebetween, and the saddle is formed of a bone material orthogonally oriented relative to the first base body top wall and the second plate portion is oriented orthogonally relative to the first base body top wall.

3. A guitar and guitar bridge assembly as set forth in claim 2 wherein the bone plate saddle includes an arcuate top edge in contiguous communication with the guitar strings, and the second plate portion includes a plurality of string mounting apertures directed therethrough in adjacency to an upper edge of the second plate portion.

4. A guitar and guitar bridge assembly as set forth in claim 3 wherein the fastener apertures are spaced apart a predetermined spacing, and the first plate portion includes first plate portion apertures spaced apart said predetermined spacing, and one of said first plate portion apertures is aligned with one of said fastener apertures, and a plurality of fastener members, with one of said fastener members directed through one of said first plate portion apertures and one of said fastener apertures.

5. A guitar and guitar bridge assembly as set forth in claim 4 wherein the first body top wall includes an adhesive coextensive therewith for securement with the second base body bottom wall.

* * * * *